Sept. 16, 1958 C. E. KLAMM 2,852,063
TUBE BENDER WITH SELF-TIGHTENING TUBE CLAMP
Filed March 9, 1956 2 Sheets-Sheet 1
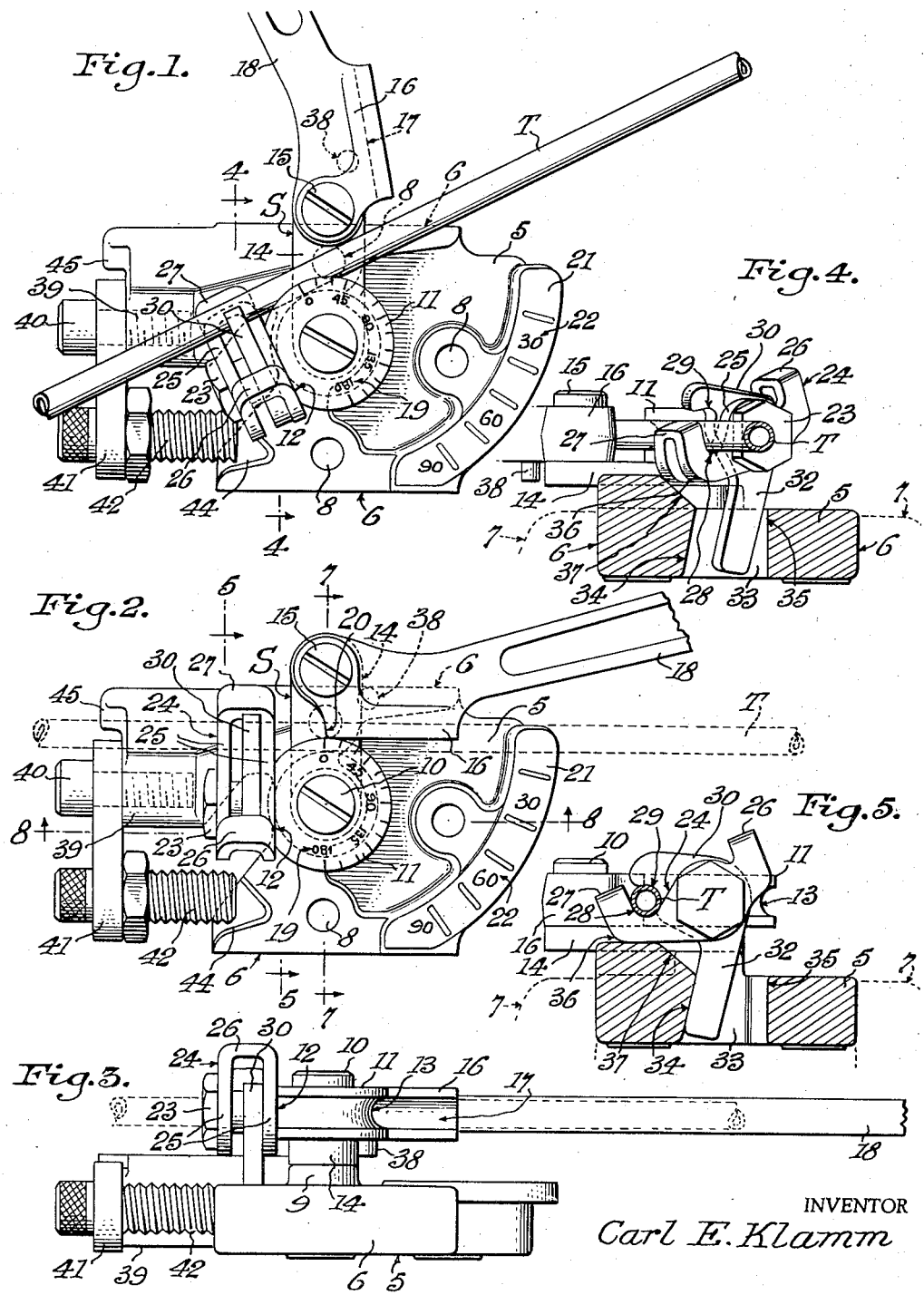
INVENTOR
Carl E. Klamm
BY
Mason, Porter, Diller & Stewart
ATTORNEYS Sept. 16, 1958  C. E. KLAMM  2,852,063
TUBE BENDER WITH SELF-TIGHTENING TUBE CLAMP
Filed March 9, 1956  2 Sheets-Sheet 2
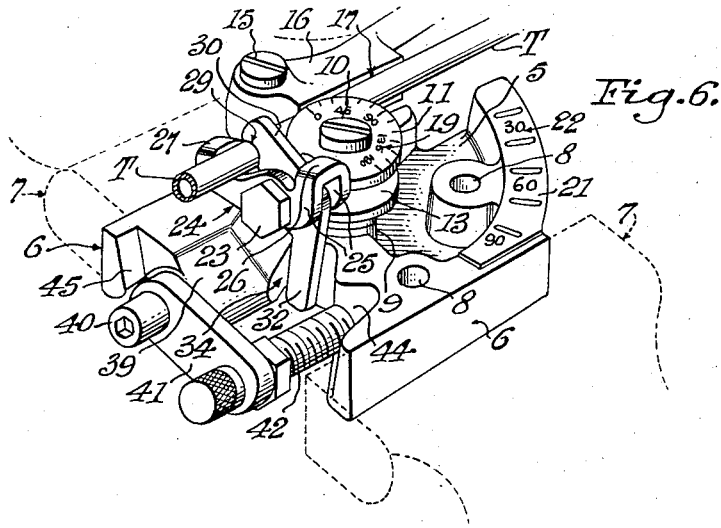
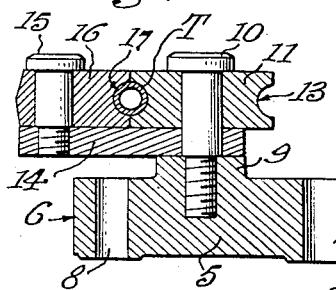
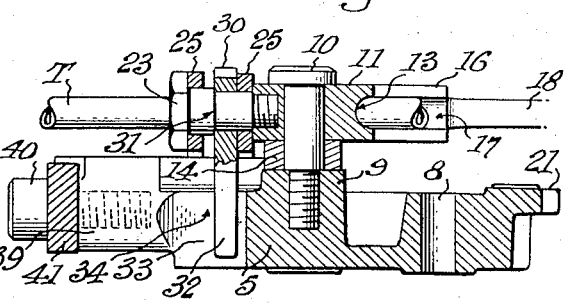
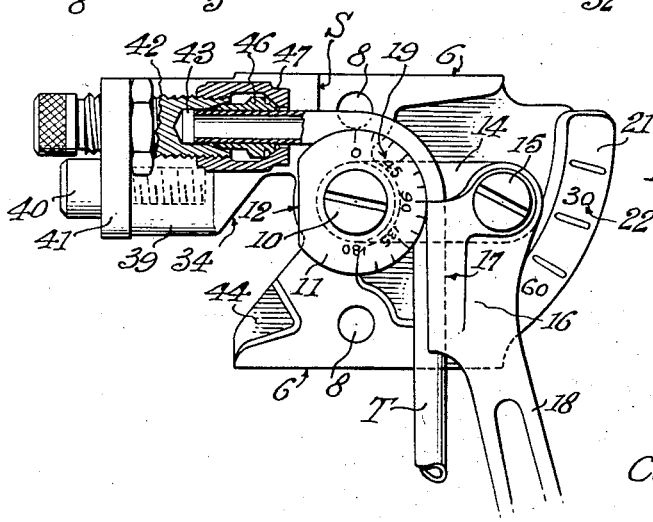
INVENTOR
Carl E. Klamm
BY
ATTORNEYS United States Patent Office 2,852,063
Patented Sept. 16, 1958

2,852,063

TUBE BENDER WITH SELF-TIGHTENING TUBE CLAMP

Carl E. Klamm, Lakewood, Ohio, assignor to Parker-Hannifin Corporation, Cleveland, Ohio, a corporation of Ohio Application March 9, 1956, Serial No. 570,578

8 Claims. (Cl. 153—46)

The invention relates generally to tube benders and primarily seeks to provide a bender having a base, a radius block, a slide block movable about the radius block to bend a tube thereabout, and a novel self-tightening clamp means for securing the tube against longitudinal movement while it is being bent about the radius block.

An object of the invention is to provide a tube bender of the character stated wherein the clamp means includes opposing clamp jaws carried by a radius block which is swingable about a center, means being provided for moving the jaws together to grip the tube which is to be bent between the jaws as the radius block is swung into cooperative relation to the slide block preparatory to commencement of a tube bending operation.

Another object of the invention is to provide in a tube bender of the character stated means for automatically increasing the tube clamping pressure of the clamp means as the slide block is moved relative to the radius block incidental to the bending of a tube.

Another object of the invention is to provide in a tube bender of the character stated means for automatically separating the clamping jaws as the radius block is moved in a direction opposite the tube bending direction and relative to the slide block after completion of a tube bending operation and return of the slide block to its original position.

Another object of the invention is to provide a tube bender of the character stated wherein the tube clamping means comprises a pair of cooperating clamping jaw members mounted on a swingable support on which at least one said jaw member is pivotally mounted for movement toward and from the other jaw member, and wherein are included cooperative cam and shoulder means engageable as the swingable support is moved in one direction on its swingable mounting to cause the pivoted jaw member to move into tube clamping position and when said support is swung in the opposite direction to cause the pivoted jaw member to move out of tube clamping position.

A further object of the invention is to provide a tube bender of the character stated wherein both clamping jaw members are pivotally mounted on the radius block and the radius block is mounted for limited swinging movement relative to the base determined by contact of one jaw member with the base and for the purpose of facilitating mounting of tubes-to-be-bent or the removal of tubes which have been bent, cam means being provided on the base and engageable by one jaw member when the radius block is swung in one direction to cause said one jaw member to move into tube engaging position and when the radius block is swung in the opposite direction to permit said one jaw member to gravitate from said tube engaging position, and other cam means being provided on the base and engageable by the other jaw member to move it into clamping engagement with the tube when the radius block is swung in said one direction and to move it out of said clamping engagement when the radius block is swung in the opposite direction.

A still further object of the invention is to provide in a tube bender of the character stated a novel optionally usable tube end clamping means swingably mounted on the base so as to be swingable, when the radius block has been swung to the tube mounting and removal facilitating position, between an effective position in which it may secure a tube end with the tube in tangential relation to the radius block periphery and an ineffective out-of-the-way position.

With the above and other objects in view that will hereinafter appear, the nature of the invention will be more clearly understood by reference to the following detailed description, the appended claims and the several views illustrated in the accompanying drawings.

In the drawings:

Figure 1 is a plan view, the parts being shown in position for receiving a tube-to-be-bent with great facility.

Figure 2 is a view similar to Figure 1, the parts being shown in position for starting a bending operation on a tube shown in clamped position in dotted lines.

Figure 3 is a side elevation illustrating the parts in the position shown in Figure 2.

Figure 4 is a vertical cross section taken on the line 4—4 in Figure 1, the tube clamping parts being shown in the separated condition for releasing a tube which has been bent, or for receiving a tube which is to be bent.

Figure 5 is a vertical cross section taken on the line 5—5 on Figure 2, the tube clamping parts being shown in the tube gripping or clamping position.

Figure 6 is a perspective view illustrating the tube bender with its parts positioned as in Figure 2 and being supported between the jaws of a vise, said jaws being shown in dotted lines, as in Figures 4 and 5.

Figure 7 is a vertical cross section taken on the line 7—7 on Figure 2.

Figure 8 is a vertical longitudinal section taken on the line 8—8 on Figure 2.

Figure 9 is a plan view, parts being shown in horizontal section, the alternate screw and nut clamping means for use on tube ends being shown as secured on the end of a tube-to-be-bent, and the other tube gripping elements and their mounting screw being removed for purposes of clarity.

In the example of embodiment of the invention herein disclosed, the improved tube bender structure is shown as including a base 5 having parallel sides 6 adapting the device to be readily mounted in a vise by clamping the base between the jaws 7 of the vise as indicated in dotted lines in Figures 4, 5 and 6. Alternatively, the base apertures 8 may be utilized to receive screw or bolt means for securing the device upon a bench or other support.

The base 5 is provided with an upstanding and tapered boss 9 in which to receive a headed shoulder screw 10 whereon to rotatably support the radius block 11. It will be apparent by reference to Figures 1, 2, 5 and 8 of the drawings that the radius block has a flattened side 12, and it will also be noted that the block has a peripheral groove 13 in which to receive a tube to be bent, the curvature of the groove within the block determining the curvature to be formed in the tube.

A link 14 is interposed between the radius block 11 and the base boss 9, being pivoted at one end on the pivot screw 10. The link is engageable with the stop shoulder S provided on the base as shown in Figures 1, 2 and 9, and the free end of the link is secured by the shoulder screw 15 to a slide block 16, said block being equipped with a half groove at 17 to oppose the radius block groove and disposed to lie in tangential relation to the periphery of the radius block as illustrated in Figure 2. A handle 18 projects from the slide block for manipulation of the same during the bending of tubes.

The radius block is equipped with a 0–90–180 degrees scale 19 as indicated in Figures 1, 2, 6 and 9 of the drawings, said scale being disposed to cooperate with the end 20 of the slide block as a means for indicating the degree of bend imparted to a tube. The base 5 also may be provided with an upstanding arcuate rib 21 equipped with a scale 22 for cooperation with a handle part for similarly indicating the degree of bend imparted to a tube.

A stepped shoulder screw 23 is removably secured to the radius block in the manner clearly illustrated in Figures 2 and 8 of the drawings, and on this pivot screw is swingably mounted a lower clamp lever or jaw means generally designated 24 and having spaced parallel arms 25 connected at the end of the shorter projection of the arms by a connecting piece 26 and at the end of longer projection of the arms by a connecting piece 27. It will be noted by reference to Figures 4 and 5 that the parallel arms 25, integrally connected at 26 and 27, are shaped to present an approximately half-round seat 28 in which to receive a tube to be clamped and bent. It will also be noted by reference to Figure 8 that one of the arms 25 encircles the smaller diameter of the pivot screw 23 whereas the other arms encircle the larger diameter of said screw. The tube receiving seat of the clamp lever 24 is opposed by the tube clamping seat or surface 29 provided on the upper clamp lever or jaw means 30 which is pivoted on the screw 23 between the innermost arm 25 of the lever or jaw means 24 and the shoulder 31 of the pivot screw. The clamp lever or jaw means 30 has a depending tail 32 having clearance in the base recess or slot 33 in the manner clearly illustrated in Figures 4, 5, 6 and 8 of the drawings. The tail is engageable upon clockwise turning of the radius block with the stop shoulder 34 provided on the base, and upon anticlockwise turning of said radius block the tail is engageable with the stop shoulder 35 provided on the base. It will also be apparent by reference to Figures 4 and 5 that the arms 25 of the clamp lever or jaw means 24 are provided with curved surfaces 36 which are engageable with the camming surface 37 provided on the base.

A stop pin 38 is provided on the slide block 16 and is in engagement with the link 14 in the manner illustrated in Figure 2 in order to determine the desired tangential relation of the grooved face 17 of the slide block 16 with the periphery of the radius block 11.

In the use of the tube bending device the base is secured to a bench or other support by means of screws or bolts applied through the base apertures 8, and the handle 18 is swung into the position illustrated in Figure 1, the opposing clamping levers or jaw means 24—30 being swung to the position illustrated in Figures 1 and 4. This positioning of the clamp jaw means and the handle 18 causes the clamping jaws to be separated and also to provide a clearance between the slide block and the periphery of the radius block so as to permit application of a tube T with great facility in the manner illustrated in Figure 1. It will be noted that the end of the jaw means 24 bearing the curved surfaces 36 projects a greater distance from the axis of the pivot screw 23 than does the other end of the jaw means, and hence the longer and heavier end of said jaw means gravitates down the camming surface as the clamping means is swung to the position of Figure 4, and this action, in combination with the engagement of the tail 32 with the stop shoulder 35 and the consequent lifting of the clamping jaw surface 29 provides the wide opening of the jaws desired for facilitating insertion of tubes.

After a tube T has been inserted in the manner illustrated in Figure 1, the handle 18 is manipulated to place the slide block 16 in the tangential position illustrated in Figure 2, and the clamp jaw means 24—30 is moved from the position illustrated in Figure 1 to the effective position illustrated in Figures 2 and 5. In moving to the position illustrated in Figures 2 and 5 from the position illustrated in Figure 4, the rounded surfaces of the arms 25 move up the cam surface 37 to bring about proper engagement of the jaw seats 28 against the under-surface of the tube T, and the engagement of the tail 32 with the stop shoulder 34 causes the upper jaw surface 29 to engage over the tube T. It will be apparent by reference to Figure 2 that as the handle 18 is now manipulated to swing the link 14 in a clockwise direction to bend the tube T about the grooved periphery of the radius block 11 there will be a tendency to swing the clamp jaw gripped portion of the tube outwardly away from the radius block. This tendency will increase the pressure of the tail 32 against the stop shoulder 34 and the pressure of the clamping jaw 29 downwardly against the tube T. It will be apparent by reference to Figure 5 that the undersurfaces of the arms 25 are resting on the top surface of the base to resist any tendency of the arms 25 to swing downwardly, and thus the tube T is firmly clamped between the jaw surfaces 28 and 29. As the bending pressure is applied to the handle 18, the clamping pressure of the jaw portions 28 and 29 against the tube will be accentuated and the tube T will be securely held against slippage while the bending of the tube is in progress. By observing the relation of the end shoulder 20 of the slide block 16 and the radius block scale 19 an operator can conveniently ascertain the degree of bend being imparted to a tube.

After the bending of the tube is completed, the handle 18 is turned in the reverse direction to swing the die block into the tube releasing position illustrated in Figure 1, and the clamp jaw means 24, 30 are swung from the clamping position illustrated in Figures 2 and 6 to the release position illustrated in Figure 4, the curved surfaces 36 of the arms 25 gravitating down the camming surface 37 to drop the lower clamping jaws 28 away from the tube T and the tail 32 coming against the stop shoulder 35 to lift the upper clamping jaw 29 away from the tube.

An alternative clamping means is provided in the tube bending device and may be utilized instead of the previously described clamping devices, if desired. This alternative clamping means is employed when it is desired to make a bend near an end extremity of a tube, and it serves a purpose of securely anchoring said tube end against longitudinal movement during the bending operation. In this connection it is to be noted that the base is provided with a boss 39 having a shoulder screw 40 secured thereto, and providing a pivot for one end of a link 41. A screw 42 is adjustably secured at the free end of the link 41, said screw having a socket 43 in the end thereof in which to receive the end of a tube to be bent in the manner clearly illustrated in Figure 9. The link 41 is swingable from the out-of-the-way position illustrated in Figures 1, 2 and 6 into the effective position illustrated in Figure 9. When the alternative means is in its ineffective position the end of the screw 42 is receivable in the base recess 44, and it is to be understood that when the clamping devices 24—30 are in the unclamping position illustrated in Figure 1, the link 41 and the screw 42 carried thereby can be swung from the ineffective position of Figures 1, 2 and 6 to the effective position illustrated in Figure 9 without interfering with the positioning of the other clamping device. In its effective position, the screw socket 43 is lined up with the tube end when the same is projecting tangentially from the periphery of the radius block as shown in Figure 9, the link 41 being accurately placed against the base stop 45. When a tube is to be secured to the screw 42 it is equipped with a shoulder ferrule or ring 46 and is removably secured in the screw socket by use of the nut 47. Figure 9 shows the bending of a tube in process with the end extremity of the tube secured against endwise movement by the attachment thereof to the socket screw 42 in the manner previously described.

A preferred embodiment of the invention is described in detail herein, but it is to be understood that variations in the structure and arrangement of parts may be made without departing from the spirit and scope of the invention, as defined in the appended claims.

I claim:
1. In a tube bender, a base, a radius block having a peripheral face curved to conform to the curvature to which a tube is to be bent, means mounting the block on the base for limited swinging movement relative to the base and about the center of curvature of said peripheral face, a link pivotally supported on the base for swinging movement about said center, a bending handle pivotally connected to the free end of said link and having a slide block portion presentable in opposition to the radius block periphery and movable with the link to bend a tube about said periphery, clamp jaw means movable with the radius block during its swinging movement relative to the base, and means effective for causing the clamp jaw means to move into tube gripping contact with a tube-to-be-bent as the radius block is moved in one direction of its swinging movement and effective for causing said clamp jaw means to move out of said tube gripping contact as the radius block is moved in the opposite direction of its swinging movement.

2. Tube bender structure as defined in claim 1 wherein the slide block portion includes a straight line face presentable in tangential relation to the radius block periphery, stop means being provided on the slide block portion and engageable with the link for limiting swinging movement of the slide block portion toward the block periphery in said tangential relation, said block having a bend degree indicating scale thereon including a bend start indicating zero mark and said slide block portion having an indicator alignable with said mark when the stop means is engaging the link, and there also being included on the base, stop means engageable by the link for positioning the link in right angular relation to said straight line face when the other stop means and link are in engagement with the slide block portion indicator mark aligned with the zero mark of the scale to determine a bend start position of the parts.

3. Tube bender structure as defined in claim 1 wherein the means for causing the clamp jaw means to move into tube gripping contact includes devices for automatically tending to increase the tube clamping pressure of the clamp jaw means as the slide block portion is moved about the radius block periphery incidental to the bending of a tube.

4. In a tube bender, a base, a radius block having a peripheral face curved to conform to the curvature to which a tube is to be bent, a link pivotally supported on the base for swinging movement about the center of curvature of said peripheral face, a bending handle pivotally connected to the free end of the link and having a slide block portion presentable in opposition to the radius block periphery and movable with the link to bend a tube about said periphery, clamp jaw means, means supporting the clamp jaw means for limited shifting movement about the center of curvature of the radius block, means for bringing about movement of the clamp jaw means about the center of curvature of the radius block, and means effective for causing the clamp jaw means to move into tube gripping contact with a tube-to-be-bent as the clamp jaw means is moved in one direction about the center of curvature of the radius block and effective for causing said clamp jaw means to move out of said tube gripping contact as the clamp jaw means is moved in the opposite direction about the center of curvature of the radius block.

5. Tube bender structure as defined in claim 4 wherein the clamp jaw means includes at least one jaw mounted on a pivot support, and wherein the means causing the jaw means to move to and from clamping engagement with a tube comprises a tail piece carried by the jaw and disposed between spaced cam shoulders on the base so that as the support is shifted in one direction one cam shoulder will be engaged by the tail piece to move the jaw into clamping contact with the tube and as the support is shifted in the opposite direction the other cam shoulder will be engaged by the tail piece to move the jaw out of contact with the tube.

6. Tube bender structure as defined in claim 4 wherein the clamp jaw means includes two jaws mounted on a pivot support, one said jaw having a tube receiving arcuate seat disposed to underlie a tube and the other jaw having a tube engaging arcuate seat disposed to overlie a tube in opposition to the first mentioned seat, said other jaw having a depending tail piece and said one jaw having a curved camming surface, and said base having a clearance therein presenting two spaced cam shoulders between which said tail piece depends and said base also having a sloping cam surface engageable by said curved camming surface, whereby when the support is shifted in one direction one cam shoulder will be engaged by the tail piece to move its jaw into clamping contact with the tube and when the support is shifted in the opposite direction the other cam shoulder will be engaged by the tail piece to move its jaw out of contact with the tube, and when the support is shifted in said one direction said one jaw camming surface will ride up the sloping cam surface to engage said one jaw with the tube and when the support is shifted in said other direction said camming surface will ride down said sloping cam surface to permit said one jaw to move away from its tube contacting position.

7. Tube bender structure as defined in claim 4 wherein the clamp jaw means includes two jaws mounted on a pivot support, one said jaw having a tube receiving arcuate seat disposed to underlie a tube and the other jaw having a tube engaging arcuate seat disposed to overlie a tube in opposition to the first mentioned seat, said other jaw having a depending tail piece and said one jaw having a curved camming surface, and said base having a clearance therein presenting two spaced cam shoulders between which said tail piece depends and said base also having a sloping cam surface engageable by said curved camming surface, whereby when the support is shifted in one direction one cam shoulder will be engaged by the tail piece to move its jaw into clamping contact with the tube and when the support is shifted in the opposite direction the other cam shoulder will be engaged by the tail piece to move its jaw out of contact with the tube, and when the support is shifted in said one direction said one jaw camming surface will ride up the sloping cam surface to engage said one jaw with the tube and when the support is shifted in said other direction said camming surface will ride down said sloping cam surface to permit said one jaw to move away from its tube contacting position, and wherein the base includes a back up support portion whereon said one jaw rests when it is opposed in tube clamping relation by the overlying jaw, and wherein said one jaw is overbalanced on its pivot mounting so that it will gravitate away from its tube contacting position as the curved camming surface moves down over the sloping cam surface.

8. Tube bender structure as defined in claim 4 wherein the clamp jaw means includes two jaws mounted on a pivot support, one said jaw having a tube receiving arcuate seat disposed to underlie a tube and the other jaw having a tube engaging arcuate seat disposed to overlie a tube in opposition to the first mentioned seat, said other jaw having a depending tail piece and said one jaw having a curved camming surface, and said base having a clearance therein presenting two spaced cam shoulders between which said tail piece depends and said base also having a sloping cam surface engageable by said curved camming surface, whereby when the support is shifted in one direction one cam shoulder will be engaged by the tail piece to move its jaw into clamping contact with the tube and when the support is shifted in the opposite direction the other cam shoulder will be engaged by the tail piece to move its jaw out of contact with the tube, and when the support is shifted in said one direction said one jaw camming surface will ride up the sloping cam surface to engage said one jaw with the tube and when the support is shifted in said other direction said camming surface will ride down said sloping cam surface to permit said one jaw to move away from its tube contacting position, and wherein the pivot support for the jaws is secured to the radius block and the radius block is mounted for limiting swinging movement about the center of curvature of its peripheral face between an effective tube bending position and a tube receiving or releasing position.

References Cited in the file of this patent

UNITED STATES PATENTS

| | | |
|---|---|---|
| 2,127,185 | Parker | Aug. 16, 1938 |

FOREIGN PATENTS

| | | |
|---|---|---|
| 525,895 | Great Britain | Sept. 6, 1940 |
| 454,731 | Canada | Feb. 22, 1949 |
| 637,943 | Great Britain | May 31, 1950 |